Oct. 12, 1965 D. A. HORSTKORTA 3,211,842

TAPE TRANSPORT WITH CONCENTRIC COILS ROTATING AT DIFFERENT SPEEDS

Filed Oct. 2, 1961 6 Sheets-Sheet 1

DONALD A. HORSTKORTA
INVENTOR.

BY Robert S. Clay

ATTORNEY

Oct. 12, 1965 D. A. HORSTKORTA 3,211,842

TAPE TRANSPORT WITH CONCENTRIC COILS ROTATING AT DIFFERENT SPEEDS

Filed Oct. 2, 1961 6 Sheets-Sheet 2

DONALD A. HORSTKORTA
INVENTOR.

BY Robert S. Clay

ATTORNEY

Oct. 12, 1965 D. A. HORSTKORTA 3,211,842

TAPE TRANSPORT WITH CONCENTRIC COILS ROTATING AT DIFFERENT SPEEDS

Filed Oct. 2, 1961 6 Sheets-Sheet 3

DONALD A. HORSTKORTA
INVENTOR.

BY Robert S. Clay

ATTORNEY

DONALD A. HORSTKORTA
INVENTOR.

BY Robert G. Clay

ATTORNEY

Oct. 12, 1965 D. A. HORSTKORTA 3,211,842

TAPE TRANSPORT WITH CONCENTRIC COILS ROTATING AT DIFFERENT SPEEDS

Filed Oct. 2, 1961 6 Sheets-Sheet 5

DONALD A. HORSTKORTA
INVENTOR.

BY Robert G. Clay

ATTORNEY

Oct. 12, 1965 D. A. HORSTKORTA 3,211,842

TAPE TRANSPORT WITH CONCENTRIC COILS ROTATING AT DIFFERENT SPEEDS

Filed Oct. 2, 1961 6 Sheets-Sheet 6

DONALD A. HORSTKORTA
INVENTOR.

BY Robert G. Clay
ATTORNEY

United States Patent Office — 3,211,842 — Patented Oct. 12, 1965

3,211,842
TAPE TRANSPORT WITH CONCENTRIC COILS ROTATING AT DIFFERENT SPEEDS

Donald A. Horstkorta, Menlo Park, Calif., assignor to Ampex Corporation, Redwood City, Calif., a corporation of California Filed Oct. 2, 1961, Ser. No. 142,331
14 Claims. (Cl. 179—100.2)

This invention relates to tape transports and particularly to tape transports adapted for rapid search and rewind operation.

In the magnetic tape transparent art, the tape is usually unwound from a supply reel and passed through a transducing head and capstan assembly and thence to a separate takeup reel. When it is desired to find a particular item of information that has already been recorded on the tape, it is necessary to run the tape in forward operation until the desired item is opposite the transducing head. The speed limitations of this type of transport are such that considerable time is used up in merely finding the information. Likewise, when it is desired to rewind the tape from the takeup reel to the supply reel, a very great wastage of time ensues.

Accordingly, it is an object of the present invention to provide an apparatus for transporting a tape with extreme rapidity from a supply coil to a takeup coil so as to effect a rapid search for desired information.

It is another object of the invention to provide an apparatus for extremely rapid rewinding of a tape from a takeup reel and back upon a supply reel.

It is a further object of the invention to provide an apparatus for transporting a magnetic tape and for automatically and with extreme rapidity locating a desired item of information of the tape and quickly reproducing the information, the apparatus being also adapted for returning the tape to a storage position with extreme rapidity upon conclusion of the playing operation.

A tape transport in accordance with the present invention satisfies the foregoing and other purposes by making use of a tape coil that is arranged in a pair of concentric sub-coils that are spaced radially from one another, with an intermediate portion of the tape stretched from the outer periphery of the inner sub-coil to the inner periphery of the outer sub-coil. The machine is arranged to rotate the two sub-coils at different speeds so as to transfer tape from the outer sub-coil to the inner sub-coil, and to stop the tape when the desired information is located in the intermediate portion between the two sub-coils. Transducting apparatus is then automatically applied to the intermediate portion of the tape. For rewinding the tape to the outer sub-coil, the two sub-coils are again rotated at different speeds with the outer sub-coil being rotated at sufficient speed to cause the tape to be drawn to it by the action of contrifugal force. Because only a few differential turns of the sub-coils are sufficient to transfer even a very great length of tape from one to the other, both the searching and the rewinding operations are accomplished with extreme rapidity.

Other objects and advantages will be explained in the following specification considered together with the accompanying drawings, in which.

Figure 1:
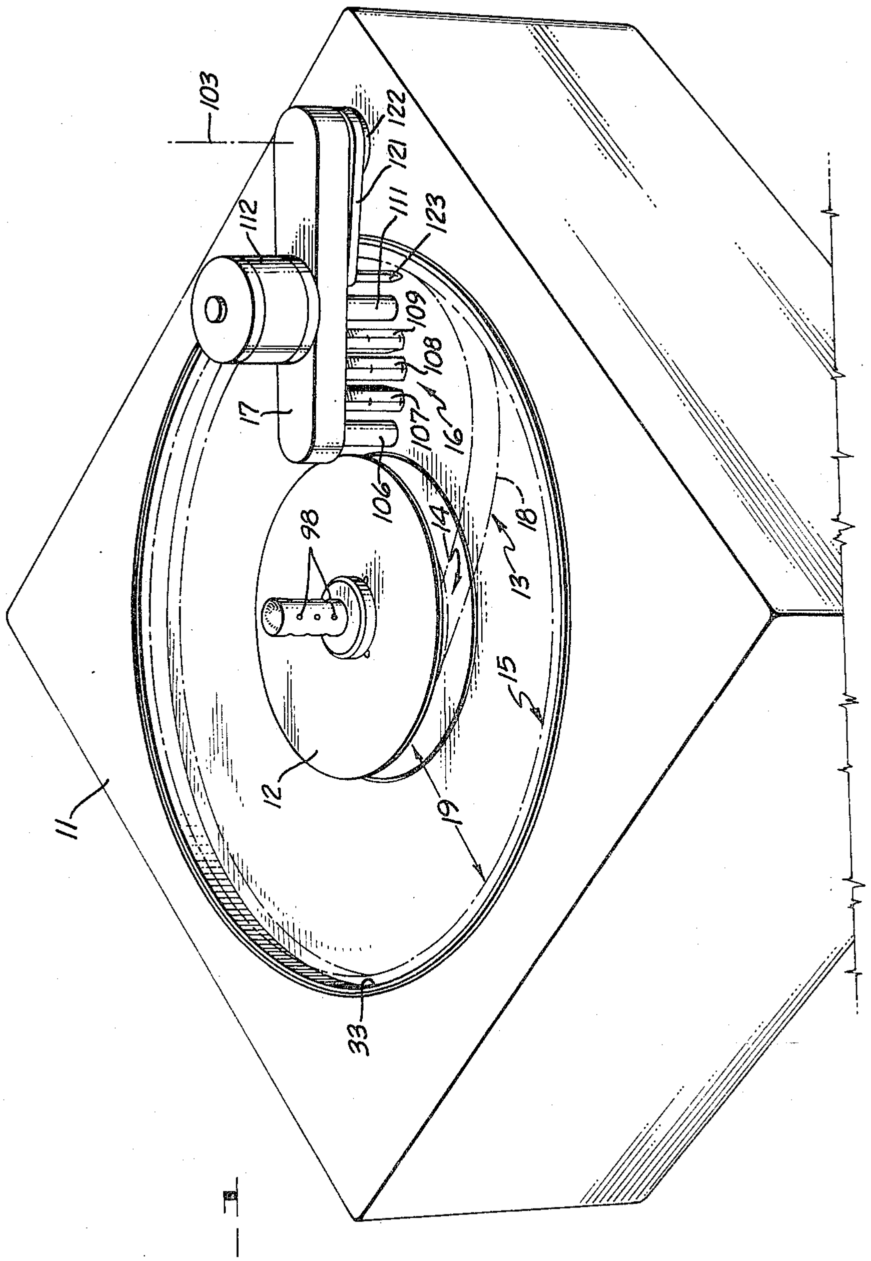
FIGURE 1 is a perspective view of a tape transport constructed in accordance with the invention.
Figure 2:
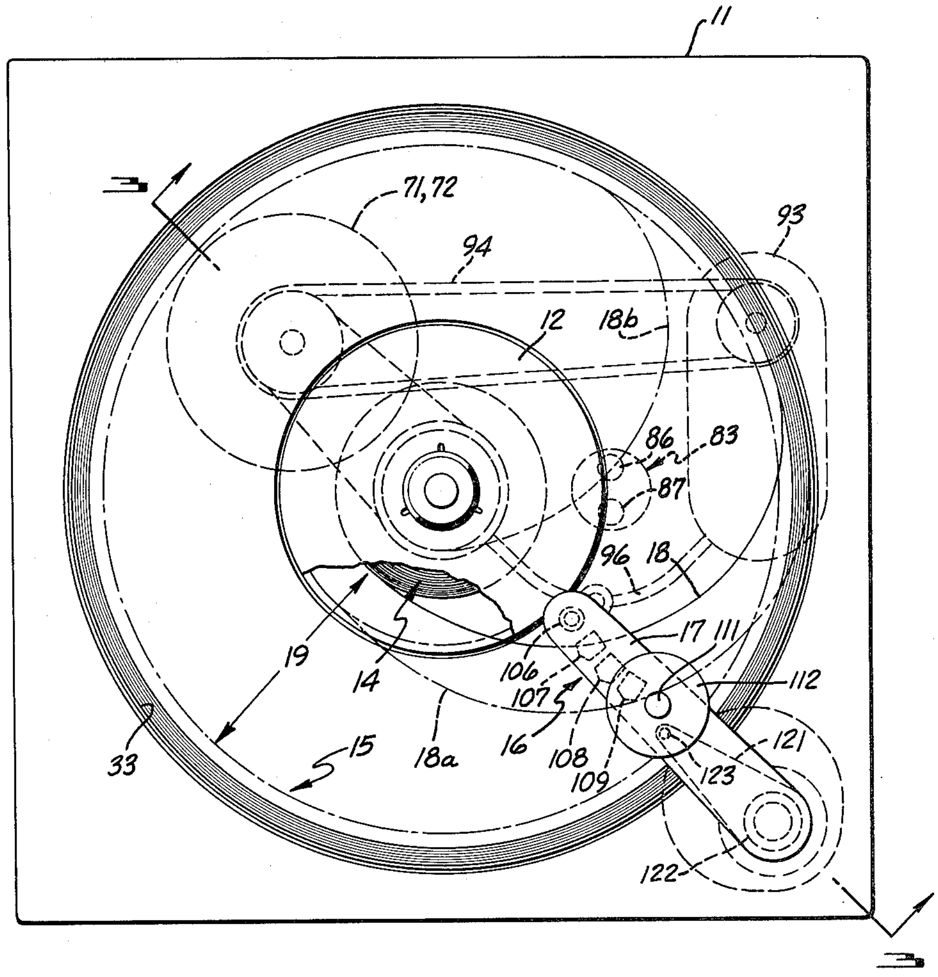
FIGURE 2 is a plan view of the apparatus shown in FIGURE 1.
Figure 3:
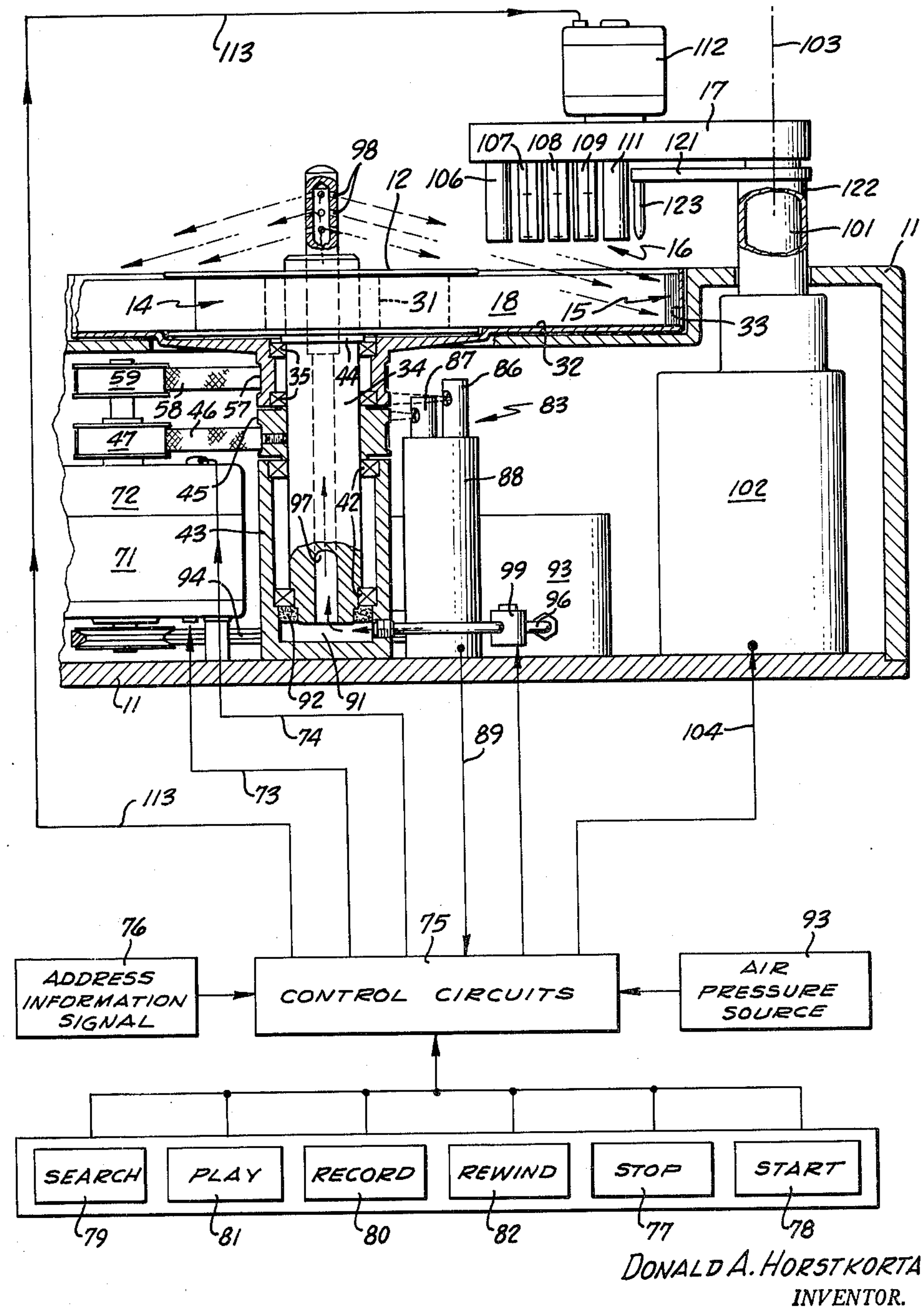
FIGURE 3 is a cross-sectional elevation view, of a portion of the apparatus taken along the plane of lines 3—3 of FIGURE 2, together with a schematic representation of some of the control circuits of the invention.

Referring now to FIGURES 1–3 there is shown a tape transport including a housing 11 on the top of which a reel 12 of tape 13 is fitted for rotation. The reel 12 is so arranged that the tape 13 is divided into an inner sub-coil 14 and an outer sub-coil 15. A transducing apparatus 16 is suspended from an arm 17 and is positioned between the sub-coils 14–15 so as to be able to engage an intermediate portion 18 of the tape. When it is desired to search for a particular item of information on the tape 13, or to wind or rewind the tape 13 very rapidly from one of the sub-coils to the other, the transducing apparatus 16 is held in an inoperative retracted position vertically above the space 19 between the sub-coils 14–15.

The searching and winding process requires rotating the inner sub-coil 14 at a speed different from that of the outer sub-coil 15; and the reel 12 consequently includes an inner hub 31 to which the inner end of the tape sub-coil 14 is affixed, and an outer tape supporting plate 32 having a peripheral flange 33 directed in the same axial direction as the hub 31, the outer end of the tape in sub-coil 15 being affixed to the flange 33. The hub 31 is mounted on and keyed for rotation with a central spindle 34. The spindle and plate 32 are rotatable with respect to one another and are journaled as by means of anti-friction bearings 35.

The motive means for the reel is constructed as follows. The spindle 34 is journaled as by anti-friction bearings 42 in a support frame 43 extending from the housing 11. A shoulder 44 formed on the spindle 34 serves to support the reel hub 31. The spindle 34 is rotated as by means of a pulley 45, a belt 46 looped around the pulley 45, and a drive pulley 47 also engaged by the belt 46.

The rotation of the outer plate 32 and flange 33 of the reel 12 is provided by means of a pulley 57 formed thereon, which is driven by a belt 58 and a drive pulley 59.

To provide a controlled differential rotation of the hub and plate 32, the drive pulleys 59 and 47 are rotated by a motor 71 operating through a torque differential motor 72. The operation of the motor 72 is well known in the art, and consists for example of rotating the stator of the motor 72 by means of the motor 71, the stator of the motor 72 also being coupled to the pulley 47; while the rotor of the motor 72 is coupled to the pulley 59 and is rotated as by electrical current applied to the motor 72 and at a different speed than that of the stator. The energizing currents for the two motors are applied as through electrical leads 73 and 74 from a control circuit 75. For programing the control circuit 75, there are provided an address information input means 76, and a series of control buttons, such as a stop button 77, a start button 78, a search button 79, a record button 80, a play button 81 and a rewind button 82. Also, so that the control circuit 75 may respond when a given address is found on the tape, a revolutions-difference sensing means 83 is provided, which consists of two photo-electric devices 86 and 87 arranged to observe two sets of index marks (not shown) on the respective pulleys 57 and 45, and a revolutions-difference counter 88 connected to count the difference in the number of revolutions sensed by the two devices 86 and 87. The counter 88 is coupled to the control circuit 75 by a coupling 89.

The operation of the searching and rewinding means is as follows. For searching, the process is started with all of the tape in the outer sub-coil 15, and only the extreme inner end of the tape engaging and attached to the hub 31. The reason why this action is desirable is that for searching it is generally better to wind the tape from the outside sub-coil toward the inner sub-coil, because the hub 31 winding the tape tightly about itself provides a more solid, positive forward drive for the tape than it is possible to obtain when the tape is being wound upon the inner periphery of the outer sub-coil 15. Thus, if the tape is not entirely disposed in the outer sub-coil 15, it is first caused to be. For this purpose the rewind button 82 is pressed. The control circuit 75 then causes the plate 32 to rotate sufficiently rapidly to draw the tape centrifugally to the outer sub-coil 15; and the hub 31 is concurrently operated to pay out tape from the inner sub-coil 14. For example, plate 32 is rotated counter-clockwise (FIGURE 3), and hub 31 is rotated counter-clockwise even more rapidly. As another example, plate 32 is rotated clockwise while hub 31 is rotated clockwise more slowly, or is stopped, or is rotated counter-clockwise. The greater the differential speed between the two sub-coils, the faster is the tape transferred from one to the other.

After re-winding, the address of a desired block of information, or the address of a particular block on the tape in which it is desired to record information, is inserted into the address information input 76. The address is phrased in terms of the number of differential turns of the reel that are necessary to bring the desired block into the space 19 between the two sub-coils 14–15. The search button 79 is then actuated, to cause the control circuit 75 to supply pre-programmed signals to the motors 71 and 72, so that the hub 31 is rotated at a speed considerably faster than the speed of the plate 32 and outer sub-coil 15. As a result, the tape is drawn very quickly from the outer sub-coil 15 and wound tightly around the drum 31 to form the inner sub-coil 14. The plate 32 may be held stationary during this procedure. Alternatively the plate 32 may be rotated also and at a speed great enough to cause centrifugal force to hold the tape in sub-coil 15 firmly against the flange 33, except at the extreme inner periphery of the outer sub-coil 15, where the tape is constantly being drawn off by the even more rapidly rotating hub 31. In the meantime the revolutions-difference sensor 83 counts the number of revolutions made by the hub 31 and the number of revolutions made by the plate 32, and transmits a signal indicating the difference between these numbers of revolutions to the control circuit 75. When the revolutions-difference indicated by the sensor 83 is the same as the revolutions-difference address that was originally inserted into the control circuit 75 through the address information input 76, the control circuit 75 operates to stop the machine from revolving. Thereupon, the transducing apparatus 16 is automatically applied to the tape in a manner to be described hereinafter.

It will be understood that during the searching and rewinding operations the tape is transferred very rapidly from one sub-coil to the other, so that in fact it takes on the order of only twenty differential revolutions of the two sub-coils transfer for example, one thousand feet of five mil tape to a six-inch diameter hub, across a radial gap 19 of one-fifth of an inch. The number of differential turns required for any configuration may be calculated from the equation:

$$\frac{g}{n}=\frac{R}{N}$$

in which $g$ is the radial gap, $n$ is the number of differential revolutions, N is the number of turns in the full inner coil, and R is the radius of the middle turn of the full inner coil.

As an assistance in holding the tape in sub-coil 15 against the flange 33, an air pressure urging means is also provided. The spindle 34 and frame member 43 are formed to define an air tight chamber 91, as by means of a vacuum seal 92 inserted beneath the bearings 42. An air pressure source 93 is driven as by pulleys and a belt 94 from the motor 71. The air pressure source 93 supplies air under pressure through a conduit 96 to the chamber 91. The spindle 34 has an axial bore 97 leading from the chamber 91 to near the upper end of the shaft, which is proportioned to project substantially above the level of the top of reel 12. In the projecting upper end of the spindle 34 there are formed a number of radially and somewhat downwardly directed nozzle passages 98 communicating with the bore 97. The control circuit 75 is coupled to a valve 99 in the conduit 96 so as to cause air under pressure to be directed outwardly and downwardly from the nozzle passages 98 to assist in holding the tape in the sub-coil 15 against the flange 33.

The transducing apparatus is mounted as follows.

The arm 17 is mounted on the upper end of a vertical shaft 101 that extends from a positioning apparatus 102. The arm 17 is controllably rotatable with respect to the apparatus 102 about the axis 103 of the shaft 101, and is longitudinally slideable along the axis 103. The control circuit 75 is coupled as by means of a coupling 104 to the apparatus 102 so as to appropriately cause the arm 17 and its transducing apparatus 16 to be raised as shown in FIGURE 3 during the searching and rewinding operations and to be lowered for recording, playing or erasing the tape. The transducing apparatus 16 includes a tape guide 106 mounted at the inwardly extending end of the arm 17, a reproduce head 107, an erase head 108, a record head 109, and a capstan 111 distributed generally along the length of the arm 17 with the capstan 111 closest to the axis 103. The elements 106–111 are aligned on a curved line that is convex in the take-up direction of rotation of hub 31, i.e. in a clockwise direction as shown in FIGURE 2. This alignment insures that when the tape is stretched between the guide 106 and the capstan 111 it will be in equal contact with all three of the heads 107–109. The capstan 111 is rotatably mounted on a vertical axis and is driven by a capstan motor 112 mounted above the arm 17. A flywheel (not shown) is coupled to the capstan 111 within the housing of the motor 112. The control circuit 75 is coupled to the motor 112 as by a coupling 113 to control the operation of the capstan 111.

For assisting in the placement of the transducing apparatus 16, there is also provided a sub-arm 121 mounted beneath the arm 17 on the upper end of a shaft 122, which is formed as a hollow cylindrical sleeve surrounding the shaft 101 of arm 17. The shaft 122 and sub-arm 121 are also arranged to be raised and lowered and pivoted about the axis 103 by operation of the apparatus 102 under control of the control circuit 75. The sub-arm 121 extends to a maximum length less than the distance of capstan 111 from axis 103, and at the extending end of the sub-arm is mounted a downwardly extending finger 123. In the raised positions of the arm and sub-arm, the finger 123 extends downwardly to the same level as the elements 106–111 mounted on the arm 17.

Now it will be understood that one of the major problems in applying the transducing apparatus 16 to the segment 18 of tape between the two sub-coils, is to lower the transducing apparatus without bringing it down upon the segment 18 and crushing it. When the rapid search transfer operation is stopped the segment 18 is left randomly crossing the plate 32 between the sub-coils. To illustrate the most disadvantageous positions possible, the segment 18 in FIGURE 2 is shown as crossing the plate 32 directly beneath the arm 17 and transducing apparatus 16. This segment 18 is one such as would be left when the transfer operation is stopped somewhere in the middle of the length of tape; and in phantom a pair of segments 18*a* and 18*b* are shown illustrating the dispositions that may obtain when the transfer operations have stopped with all of the tape on the inner sub-coil and with all of the tape on the outer sub-coil respectively. It will be seen that segment 18*b* has stopped, by chance, clear of the arm 17, and that consequently in this condition the transducing apparatus could be lowered without difficulty. However, it will also be seen that the dispositions of segments 18 and 18*a* are by change such that the transducing apparatus cannot be lowered without crushing the segments unless a special procedure is used. To eliminate the need for decisions by the operator, the special procedure is used in all cases, as follows.

Figure 4:
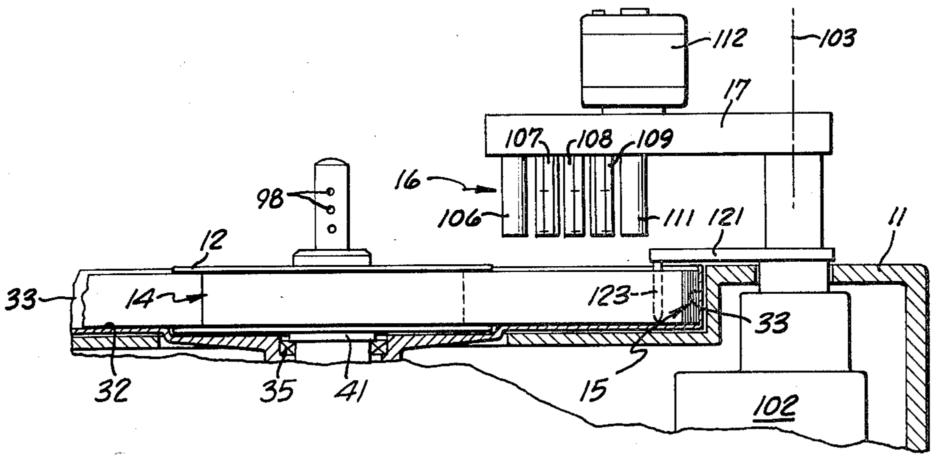
FIGURE 4 is a fragmentary cross-sectional elevation view of a portion of the apparatus shown in FIGURE 3 and illustrating a step in the operation thereof.
Figure 6:
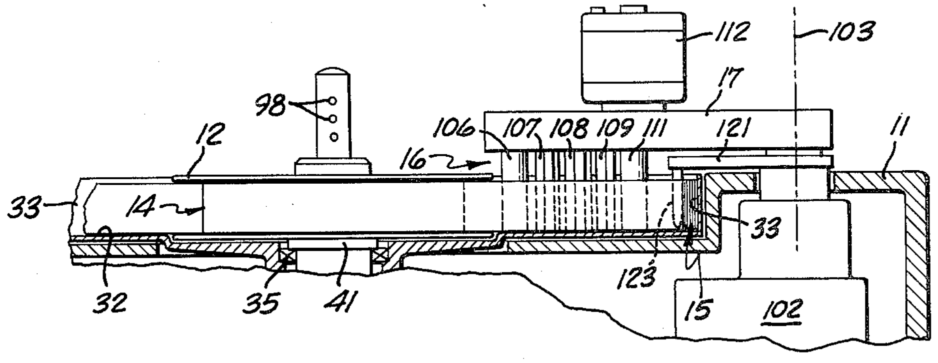
FIGURE 6 is a view similar to that of FIGURE 4, illustrating a further step of the operation.
Figure 5:
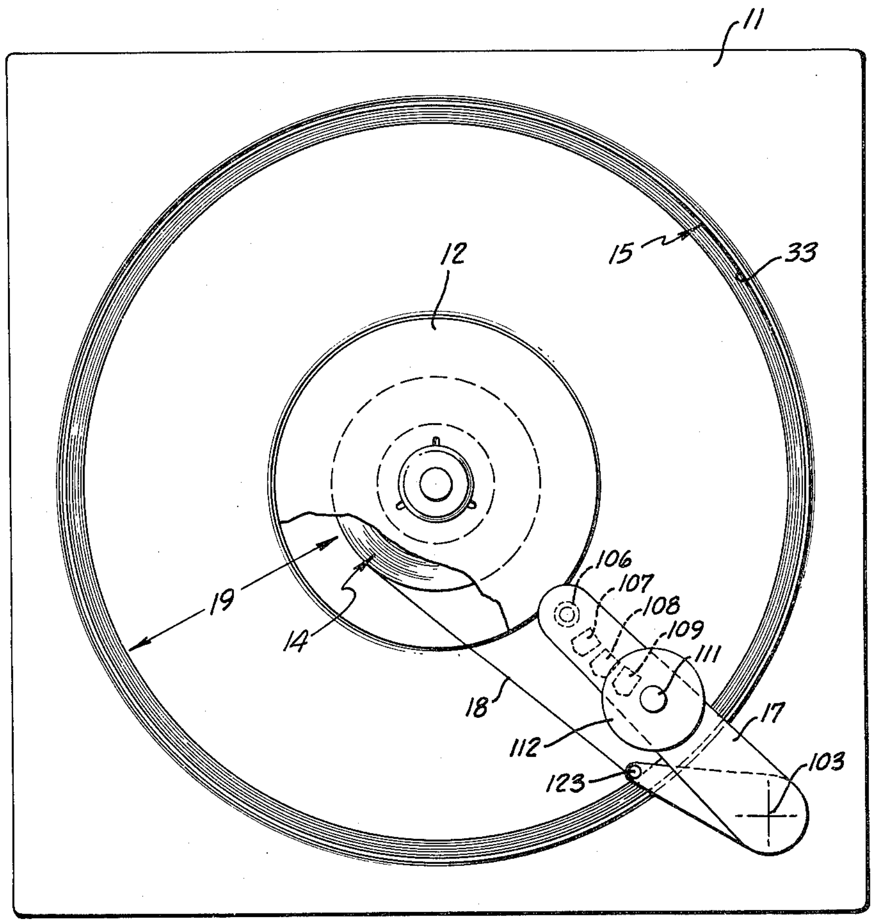
FIGURE 5 is a plan view similar to that of FIGURE 2, illustrating a further step of the operation.

As shown in FIGURES 2 and 3 the arms 17 and sub-arm 121 have inoperative positions in which they are raised and aligned generally along a radius of the coil of tape. When it is desired to insert the tranducing apparatus, the control circuit 75 causes the sub-arm 121 and finger 123 to move directly downwardly until the finger nearly engages the plate 32, as shown in FIGURE 4. No matter what the disposition of the tape segment 18, and even if the segment is directly beneath the finger, the pointed finger pushes its way to a position on one side or the other of the segment 18 without crushing the segment. The control circuit 75 then causes the sub-arm 121 to rotate in a direction that is opposite to the take-up direction of rotation of the inner sub-coil 14, until the finger engages the outer sub-coil 15 and clamps it against the flange 33 of plate 32. For example as shown in FIGURES 5 and 6, the sub-arm 121 is rotated in a counter-clockwise direction around the axis 103, the take-up direction of rotation of the inner sub-coil 14 being clockwise. The reason for this directional distinction will be clear when it is understood that the next step is to have the control circuit 75 cause rotation of the inner sub-coil 14 in the take-up direction so as to move the segment 18 counter-clockwise around the plate 32 until the segment is stretched tautly in a tangential line from the sub-coil 14 to the clamping finger 123, as shown in FIGURE 5. It will be seen that in this position the segment 18 is entirely removed from the coil radius on which the arm 17 is aligned, so that the arm 17 and transducing apparatus can descend without crushing the segment. If, on the other hand, the sub-arm 121 had been pivoted in the other direction to effect its clamping action against the outer sub-coil, then the segment 18 would have been stretched beneath the arm 17 instead of removed therefrom. This is the reason why it is specified that the sub-arm 121 is rotated in a direction opposite to the take-up direction of rotation of the inner sub-coil 14.

Figure 7:
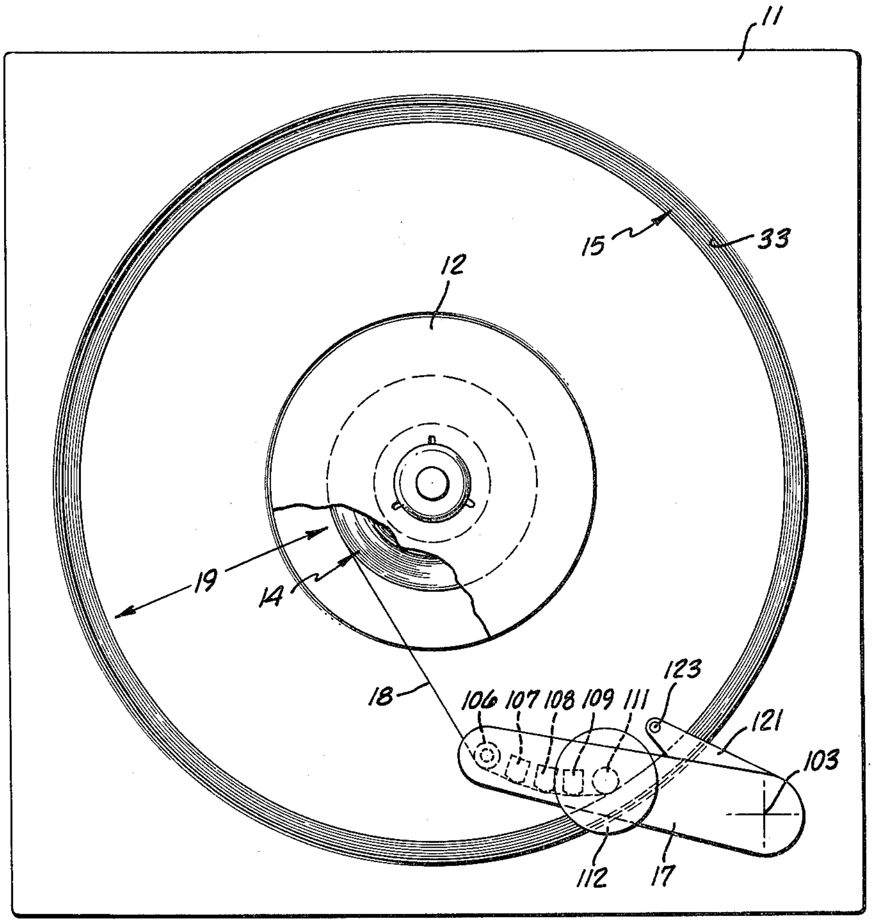
FIGURE 7 is a view similar to that of FIGURE 5 and illustrating a further step of the operation.

With the segment 18 removed entirely from beneath the transducing apparatus, the control circuit 75 next causes the arm 17 to descend as shown in FIGURE 6, and then to rotate also in a counter-clockwise direction around axis 103 until the capstan 111 likewise engages the segment 18 and the outer sub-coil 15, clamping them against the flange 33 of plate 32. This arrangement is shown in FIGURE 7, in which it will be noted that the segment 18 is accordingly stretched tautly around the guide 106 and all of the transducing heads 107–109. The control circuit 75 then causes the sub-arm 121 to pivot in a clockwise direction to its lowered inoperative position as shown in FIGURE 7, leaving the tape clamped only by the capstan 111. The control circuit 75 then causes the motor 112 to operate to rotate the capstan 111 in a counter-clockwise direction as seen in FIGURE 7 so that the tape is pulled from the inner sub-coil 14 past the transducing heads and capstan to the outer sub-coil 15. During this procedure, the control circuit 75 causes the motors 71 and 72 to release the plate 32 and outer sub-coil 15 for free take-up rotation in a counter-clockwise direction, and to apply a hold-back moment to the hub 31 so as to keep the tape segment 18 under tension. The drive is thus effected entirely through the capstan 111, which pinches the tape in both the segment 18 and the outer sub-coil 15 tightly against the flange 33 of plate 32, driving the plate 32 as well through the outer sub-coil tape pack.

When it is desired to stop transducing and to effect another search or rewind operation the appropriate button is pressed, and the control circuit 75 causes the arm 17 to pivot back to its inoperative radially aligned position, as shown in FIGURE 1, and then causes the arm 17 and sub-arm 121 both to return to their raised positions.

It will be understood that the operations described above as being under the control of the circuit 75 are all programed into the circuit 75 in a manner well known in the art, and that the operations take place in appropriately timed sequence in response to the actions of the operator in pressing the corresponding buttons 77–82.

To summarize the operation of the apparatus: With the arms 17 and 121 in radially aligned raised positions (FIGURES 2 and 3), the tape is entirely transferred to the outer sub-coil 15 as by rapid rotation of the plate 32, so that the tape is drawn centrifugally from the inner sub-coil 14. The hub 31 is meanwhile rotated in a direction to permit paying out of the tape from the inner sub-coil 14. The address of a desired block on the tape is then inserted in the address input means 76 and a search is made as by rotating the inner sub-coil 14 in a take-up direction to pull the tape inwardly from the outer sub-coil 15. The differential revolutions of the two sub-coils are counted by the sensing means 83, and when the differential revolutions count corresponds with the address, the tape is stopped. The sub-arm 121 and finger 123 are then lowered (FIGURE 4) and rotated to clamp the outer sub-coil 15 against the flange 33 (FIGURES 5 and 6). The inner sub-coil 14 is then rotated further in a take-up direction to stretch the intervening segment 18 of the tape tangentially from the inner sub-coil to the finger 123 (FIGURES 5 and 6). The arm 17 and transducing apparatus 16 are then lowered beside the segment 18 and rotated (FIGURES 6 and 7) until the transducing heads 107–109 engage the segment 18 and until the capstan 111 clamps the outer sub-coil 15 against the flange 33. The sub-arm 121 is then rotated to its inoperative radially aligned position (FIGURE 7); and the capstan 111 is rotated to pull tape from the inner sub-coil 14 and to rotate the outer sub-coil 15 in a take-up direction. The clamping force of the capstan 111 against the outer sub-coil tape pack and flange 33 is maintained by the apparatus 102 while the outer sub-coil grows in thickness. When the transducing operation has been completed, the arm 17 is rotated to its radially aligned position (FIGURE 1), and then the arm 17 and sub-arm 121 are moved to their raised positions (FIGURE 3).

Thus there has been described a tape transport in which a coil of tape is formed centrifugally into inner and outer spaced sub-coils defining an intervening segment of tape, and in which a transducing apparatus and capstan is then lowered to engage the intervening segment, the capstan being clamped against the outer sub-coil for pulling tape from the inner sub-coil and for driving the outer sub-coil in a take-up direction.

What is claimed is:

1. A transport for a coil of tape comprising: means for engaging the inner end of said tape in said coil; means for engaging the outer end of said tape in said coil; means for rotating said first and second named means concentrically with said coil and at differential speeds so as to form said coil into inner and outer spaced sub-coils having a radial space therebetween, said space being traversed by a segment of said tape lying in the same plane as said sub-coils; and processing means for engaging said tape in said space between said sub-coils.

2. A transport as characterized in claim 1, and also including means for urging said outer sub-coil radially outwardly with respect to said inner sub-coil.

3. A transport for a coil of tape comprising: means for engaging the inner end of said tape in said coil; means for engaging the outer end of said tape in said coil, said means being spaced apart for a distance substantially greater than the radial thickness of said coil; means for rotating said first and second named means concentrically with said coil and at differential speeds so as to form said coil into inner and outer spaced sub-coils having a radial space therebetween, said space being traversed by a segment of said tape lying in the same plane as said sub-coils, and with said tape segment and the confronting peripheries of said sub-coils having identical linear velocities; and processing means for engaging said tape in said space between said sub-coils.

4. A transport for a coil of magnetic tape comprising: a hub to which is secured the inner end of said tape in said coil; a concentric rim to which is secured the outer end of said tape in said coil, said hub and rim being spaced apart for a distance substantially greater than the radial thickness of said coil; means for rotating said hub and rim concentrically with said coil and at differential speeds so as to form said coil into inner and outer spaced sub-coils having a radial space therebetween, said space being traversed by a segment of said tape lying in the same plane as said sub-coils and with said segment and the confronting peripheries of said sub-coils having identical linear velocities; and magnetic transducing means for engaging said tape in said space between said sub-coils.

5. A transport for a coil of magnetic tape comprising: a hub to which is secured the inner end of said tape in said coil; a coil supporting member including a circular plate concentric with said hub, said plate having a peripheral cylindrical flange defining a rim extending in the same axial direction as said hub and spaced from said hub for a distance substantially greater than the radial dimension of said coil, the outer end of said tape in said coil being secured to said rim; means for rotating said hub and member concentrically with said coil and at differential speeds so as to form said coil into inner and outer spaced sub-coils having a radial space therebetween, said space being traversed by a segment of said tape lying in the same plane as said sub-coils and with said segment and the confronting peripheries of said sub-coils having identical linear velocities; and magnetic transducing means for engaging said tape in said space between said sub-coils.

6. A transport for a coil of magnetic tape comprising: a hub to which is secured the inner end of said tape in said coil; a circular plate concentric with and rotatably mounted with respect to said hub, said plate having a peripheral cylindrical flange defining a rim extending in the same axial direction as said hub and spaced from said hub for a distance substantially greater than the radial dimension of said coil, the outer end of said tape in said coil being secured to said rim; a first drive member in the form of a shaft concentrically supporting said hub and coupled thereto for rotation of said hub; a second drive member concentrically and rotatably mounted on said shaft and coupled to said plate for rotation of said plate and rim independently of said shaft and hub; means for rotating said first and second drive members at differential speeds so as to form said coil into inner and outer spaced sub-coils having a radial space therebetween, said space being traversed by a segment of said tape lying in the same plane as said sub-coils and with said segment and the confronting peripheries of said sub-coils having identical linear velocities; and magnetic transducing means for engaging said tape in said space between said sub-coils.

7. A transport as characterized in claim 6, wherein said shaft has an axial air channel and projects substantially beyond said hub on the same side as said rim, said projecting portion of said shaft being provided with a plurality of radial nozzle channels communicating from said axial air channel and directed at said tape coil for urging the tape in said outer sub-coil outwardly against said rim; and means for supplying pressurized air to said axial channel of said shaft.

8. A transport for a coil of tape comprising: means for forming said coil into a pair of concentric inner and outer sub-coils spaced radially from one another and connected by an intervening segment of tape; means for engaging said segment of tape and for stretching said segment tangentially from the outer portion of said inner sub-coil to the inner portion of said outer sub-coil; processing means for said tape; means for mounting said processing means, said mounting means having a first position in which said processing means is remote from said tape, a second position in which said processing means is inserted between said sub-coils remote from said stretched segment of tape, and a third position in which said processing means is laterally engaged with said stretched segment of tape; means for moving said mounting means between said positions; and means for transferring said tape from one to another of said sub-coils, whereby said tape is serially transported past said processing means.

9. A transport for a coil of magnetic tape comprising: a hub mounted on a vertical axis, and having the inner end of said tape secured thereto; a coil supporting member including a circular plate concentric with said hub, said plate having a peripheral cylindrical flange defining a rim extending in the same axial direction as said hub and spaced from said hub for a distance substantially greater than the radial dimensions of said coil, the outer end of said tape in said coil being secured to said rim; means for rotating said hub and member concentrically with said coil and at differential speeds so as to form said coil into inner and outer spaced sub-coils; a positioning arm mounted above said plate for vertical motion toward and away from said plate; means for moving said arm toward and away from said plate; a magnetic transducer and a capstan for engaging said tape between said sub-coils, said transducer and capstan being mounted on said positioning arm for horizontal positioning above the interval between said sub-coils and for vertical motion in conjunction with the motion of said arm to descend into the interval between said sub-coils; means for causing frictional engagement between said tape and capstan when said transducer and capstan are located in the interval between said sub-coils; and drive means for said capstan.

10. A transport as characterized in claim 9, wherein said positioning arm is also mounted for horizontal pivoting motion about a vertical axis that lies radially outward from said flange, and wherein said capstan engaging means includes means for pivoting said arm to cause said capstan to engage the inner turn of said outer sub-coil and to clamp said outer sub-coil against said flange, said capstan drive means being arranged to rotate said capstan in a direction to pull said tape from said inner sub-coil and to correspondingly drive said outer sub-coil together with said flange and plate to take up said tape coming from said capstan.

11. A transport as characterized in claim 10, and also including a sub-arm extending from said axis beneath said arm, said sub-arm being mounted for vertical motion along said axis and for pivoting motion about said axis to and from an inoperative position aligned generally along a radius of said coils, said sub-arm being provided with a finger member extending downwardly from a point that is substantially radially inward from the inner turn of said outer sub-coil when said sub-arm is in said inoperative position and when said outer sub-coil contains the maximum amount of tape; and means for raising and lowering said sub-arm and finger member independently of the motion of said arm, whereby said transducer and capstan are applied to said tape by first aligning said arm and said sub-arm along a radius of said coils and with both said arm and said sub-arm in raised positions, then lowering said sub-arm until said finger nearly engages said plate, then pivoting said sub-arm in a direction opposite to the take-up direction of rotation of said inner sub-coil so as to clampingly engage the inner turn of said outer sub-coil, then rotating said hub in said take-up direction until the segment of tape between said sub-coils extends tangentially from said inner sub-coil and around said finger to said outer sub-coil, then lowering said arm to insert said capstan and transducer in the space between said inner and outer sub-coils, then rotating said arm to cause said capstan to engage said outer sub-coil and said transducer to engage said segment of tape, then pivoting said sub-arm away from said outer sub-coil, and finally rotating said capstan to pull said tape from said inner sub-coil.

12. A transport as characterized in claim 11, wherein said transducer includes a group of magnetic heads distributed generally along the length of said arm and between said capstan and the extending end of said arm, said capstan and heads being particularly aligned away from said outer sub-coil, and finally rotating said capstan to pull said tape from said inner sub-coil.

13. A transport for a coil of magnetic tape comprising: a hub to which is secured the inner end of said tape in said coil, said hub being mounted on a vertical axis; a circular plate concentric with and rotatable with respect to said hub, said plate having a peripheral cylindrical flange defining a rim extending in the same axial direction as said hub and spaced from said hub for a distance substantially greater than the radial dimension of said coil, the outer end of said tape in said coil being secured to said rim; a first drive member in the form of a shaft concentrically supporting said hub and coupled thereto for rotation of said hub; a second drive member concentrically and rotatably mounted on said shaft and coupled to said plate for rotation of said plate and rim independently of said shaft and hub; means for rotating said first and second drive members at differential speeds so as to form said coil into inner and outer spaced sub-coils; means associated with said drive members for sensing the difference in revolutions thereof as a measure of the length of tape transferred from one sub-coil to the other; a horizontal positioning arm mounted for vertical motion above said plate; a magnetic transducer and a capstan for engaging said tape between said sub-coils, said transducer and capstan being mounted on said positioning arm for positioning above the interval between said sub-coils and for vertical motion to descend into the interval between said sub-coils; means for causing frictional engagement between said tape and capstan when said transducer and capstan are located in the interval between said sub-coils; drive means for said capstan; and means coupled to said drive member rotating means and to said sensing means for controlling the transfer of tape between said sub-coils so as to bring any segment of tape having a predetermined address to a position between said sub-coils for application thereto of said transducer, said control means also being coupled to said positioning arm for application of said transducer and capstan to said tape segment, and said control means being coupled to said capstan drive means for rotation of said capstan.

14. A transport for a coil of magnetic tape comprising: a hub to which is secured the inner end of said tape in said coil, said hub being mounted on a vertical axis; a circular plate concentric with and rotatable with respect to said hub, said plate having a peripheral cylindrical flange defining a rim extending in the same axial direction as said hub and spaced from said hub for a distance substantially greater than the radial dimension of said coil, the outer end of said tape in said coil being secured to said rim; a first drive member in the form of a shaft concentrically supporting said hub and coupled thereto for rotation of said hub; a second drive member concentrically and rotatably mounted on said shaft and coupled to said plate for rotation of said plate and rim independently of said shaft and hub; means for rotating said first and second drive members at differential speeds so as to form said coil into inner and outer spaced sub-coils; means associated with said drive member for sensing the difference in revolutions thereof as a measure of the length of tape transferred from one sub-coil to the other; a horizontal positioning arm mounted for vertical motion above said plate and for horizontal pivoting motion about a vertical axis that lies radially outward from said flange, said pivoting motion being to and from an inoperative position in which said arm is aligned along a radius of said coil; a sub-arm mounted beneath said arm for vertical motion along said axis and for pivoting motion about said axis to and from an inoperative position aligned generally along a radius of said coils, said sub-arm being provided with a finger member extending downwardly from a point that is substantially radially inward from the inner turn of said outer sub-coil when said sub-arm is in said inoperative position and when said outer sub-coil contains the maximum amount of tape; means for raising and for lowering and pivoting said sub-arm and finger member independently of the motion of said arm; a group of magnetic transducers and a capstan for engaging said tape between said sub-coils, said transducers and capstan being mounted on said positioning arm radially more distant from said axis than the end of said sub-arm for positioning above the interval between said sub-coils and for vertical motion in conjunction with the motion of said arm to descend into the interval between said sub-coils, said transducers and capstan being distributed generally along the length of said arm with said capstan closest to said pivot axis, said capstan and transducers being aligned on a curved line that is convex in the take-up direction of rotation of said hub; means for raising and for lowering and pivoting said arm to cause said capstan to engage the inner turn of said outer sub-coil and to clamp said outer sub-coil against said flange when said transducers and capstan are located in the interval between said sub-coils; drive means for rotating said capstan in a direction to pull said tape from said inner sub-coil and to correspondingly drive said outer sub-coil together with said flange and plate to take up said tape coming from said capstan; and means coupled to said drive member rotating means and to said sensing means for controlling the transfer of tape between said sub-coils so as to bring any segment of tape having a predetermined address to a position between said sub-coils for application thereto of said transducers, said control means also being coupled to said means for raising, lowering and pivoting said arm, said means for raising and for lowering and pivoting said sub-arm, and said capstan drive means, whereby said transducers and capstan are applied to said tape by first aligning said arm and said sub-arm along a radius of said coils and with both said arm and said sub-arm in raised positions, then lowering said sub-arm until said finger nearly engages said plate, then pivoting said sub-arm in a direction opposite to the take-up direction of rotation of said inner sub-coil so as to clampingly engage the inner turn of said outer sub-coil, then rotating said hub in said take-up direction until the segment of tape between said sub-coils extends tangentially from said sub-coil and around said finger to said outer sub-coil, then lowering said arm to insert said capstan and transducers in the space between said inner and outer sub-coils, then rotating said arm to cause said capstan to engage said outer sub-coil and said transducer to engage said segment of tape, then pivoting said sub-arm away from said outer sub-coil, and finally rotating said capstan to pull said tape from said inner sub-coil.

References Cited by the Examiner

UNITED STATES PATENTS

| | | | |
|---|---|---|---|
| 1,631,137 | 6/27 | Kincade | 242—55.18 |
| 2,918,536 | 12/59 | Appert et al. | 179—100.2 |
| 2,975,990 | 3/61 | Rodriguez | 242—55.13 |

IRVING L. SRAGOW, *Primary Examiner.*

BERNARD KONICK, *Examiner.*